United States Patent [19]

Gallagher

[11] 4,318,156

[45] Mar. 2, 1982

[54] PORTABLE DISTRIBUTION BOX

[76] Inventor: Michael J. Gallagher, 623 Cumberland St., Lebanon, Pa. 17046

[21] Appl. No.: 145,024

[22] Filed: Apr. 30, 1980

[51] Int. Cl.³ ............................................. H02B 1/04
[52] U.S. Cl. .................................. 361/358; 307/147; 361/361; 361/363; 361/334
[58] Field of Search .................. 200/51 R; 174/52 R; 362/95, 251; 248/27, 1; 312/223; 307/112, 113, 147, 149, 150; 361/331, 332, 334, 346, 347, 350, 356, 357, 358, 360, 363, 428, 361

[56] References Cited

U.S. PATENT DOCUMENTS

| | | | |
|---|---|---|---|
| 2,995,670 | 8/1961 | Weiss | 307/147 |
| 3,554,021 | 1/1971 | Burridge | 361/334 |
| 3,631,324 | 12/1971 | Jones | 361/334 |
| 3,774,234 | 11/1973 | Blair | 361/346 |
| 3,786,312 | 1/1974 | Roussard | 307/147 |
| 3,851,226 | 11/1974 | Chen | 361/358 |
| 4,181,844 | 1/1980 | Moretto | 361/334 |

*Primary Examiner*—Gerald P. Tolin
*Attorney, Agent, or Firm*—Gerald K. Kita

[57] ABSTRACT

A portable box for electrical power distribution and blackout programming capability includes electrical outlet receptables, pilot lights and switches in wiring modules, constructed for blackout capability. Another wiring module provides blackout programming capability in a push to reset main circuit breaker, together with secondary circuit breakers providing circuit overload protection for the wiring modules.

8 Claims, 7 Drawing Figures

PORTABLE DISTRIBUTION BOX

FIELD OF THE INVENTION

The present invention relates to a portable, power distribution box, with particular emphasis placed upon a suitcase function and appearance, and upon, individual circuits, identified by pilot lights, with blackout capability of the circuits either collectively or separately.

BACKGROUND OF THE PRIOR ART

U.S. Pat. No. 3,786,312 discloses a portable box for power distribution. Each of two circuits includes three outlets coupled to a ground fault interrupter.

U.S. Pat. No. 2,995,670 discloses a portable box supported on legs and providing power distribution suitable for television or motion picture studios. Busses of incoming and outgoing power cables allow connection of plural boxes in series. A series of outlets are coupled electrically to the busses of each box through circuit breakers. Cable strain relief clamps are provided.

SUMMARY OF THE INVENTION

The present invention relates to an electrical distribution box suitable for supplying power for power tools or theatrical lighting, photographic studio lighting and sound stage equipment which are amperage demand devices. The distribution box is portable to allow a user to construct a theater, photographic studio or sound stage, on location. The box has suitable suitcase hardware and finish, giving the appearance of personalized luggage. The suitcase design also contains and protects the electrical and mechanical components of the box during transport. The box is outfitted with removable floor casters and a hidden storage compartment for the casters. The box further includes a twist lock power receptacle for connection of a Code approved power extention cord which has been electrically installed by an electrician to a 50 amp circuit breaker of a main, distribution box. Multiple lighting circuits or other equipment circuits can be plugged into outlet receptacles of the portable box, and can be separately switched by controls on a single control panel of the box. The control panel also contains pilot lights for identifying the circuits and their switched condition. The pilot lights also provide lighting for the panel in dark or dimly lighted environments. Additionally, the control panel includes push button actuated, circuit breakers for circuit protection and for blackout simulation.

OBJECTS OF THE INVENTION

An object of the present invention is to provide a portable, electrical power distribution box having a suitcase design and luggage appearance.

Another object of the present invention is to provide a portable, power distribution box with removable floor casters and hidden storage for the casters.

Another object of the invention is to provide a portable, power distribution box with a single control panel which includes outlet receptacles for supplying power to circuits, switches for programming the circuits supplied by the receptacles, pilot lights for indicating the operating condition of the circuits, and push button operated circuit breakers for circuit protection and blackout simulation.

Other objects and advantages of the present invention will become apparent from the following detailed description taken in conjunction with the drawings.

DETAILED DESCRIPTION

Figure 1:
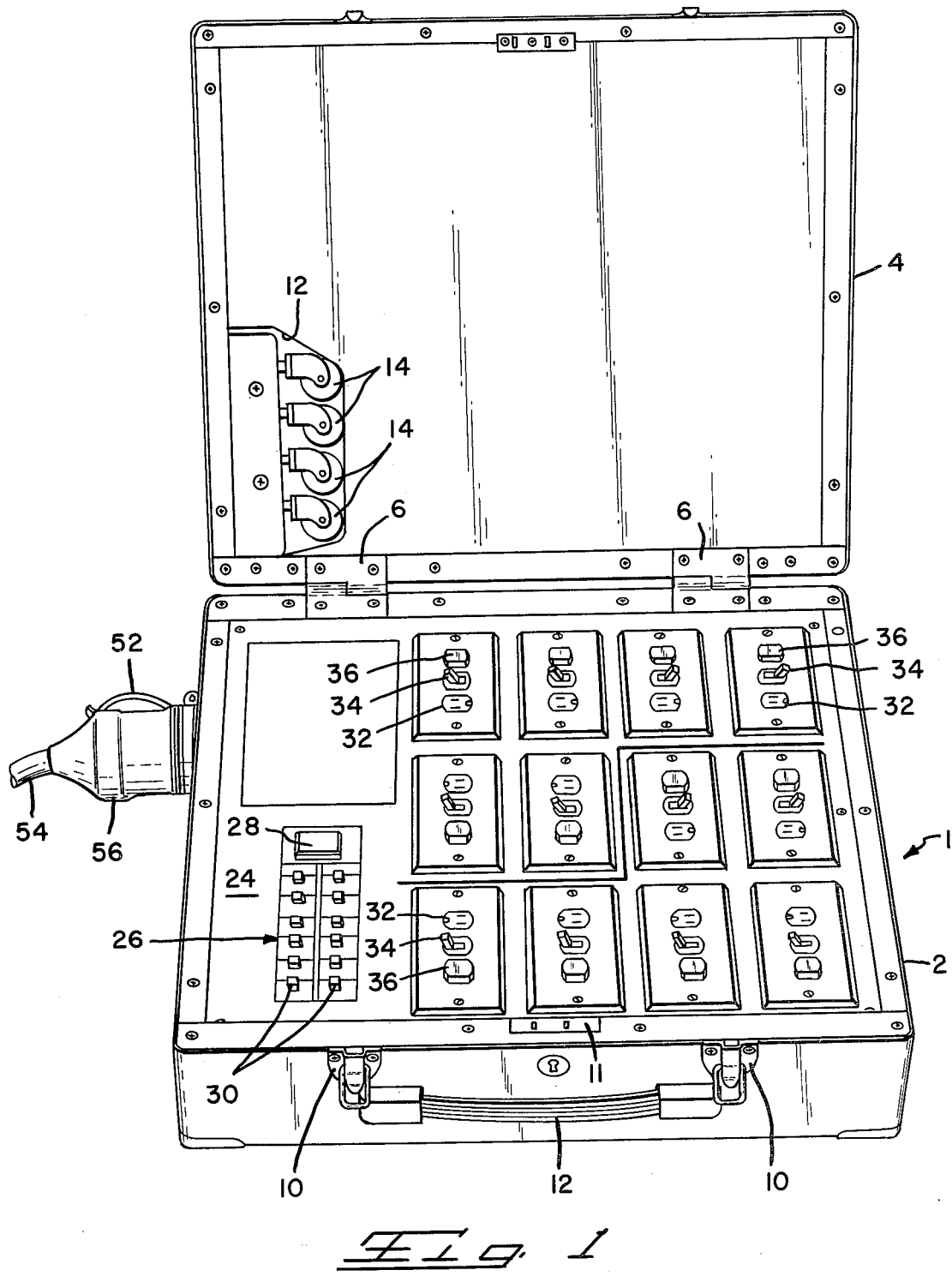
FIG. 1 is a perspective view of a preferred embodiment of a portable distribution box and a power cord.
Figure 2:
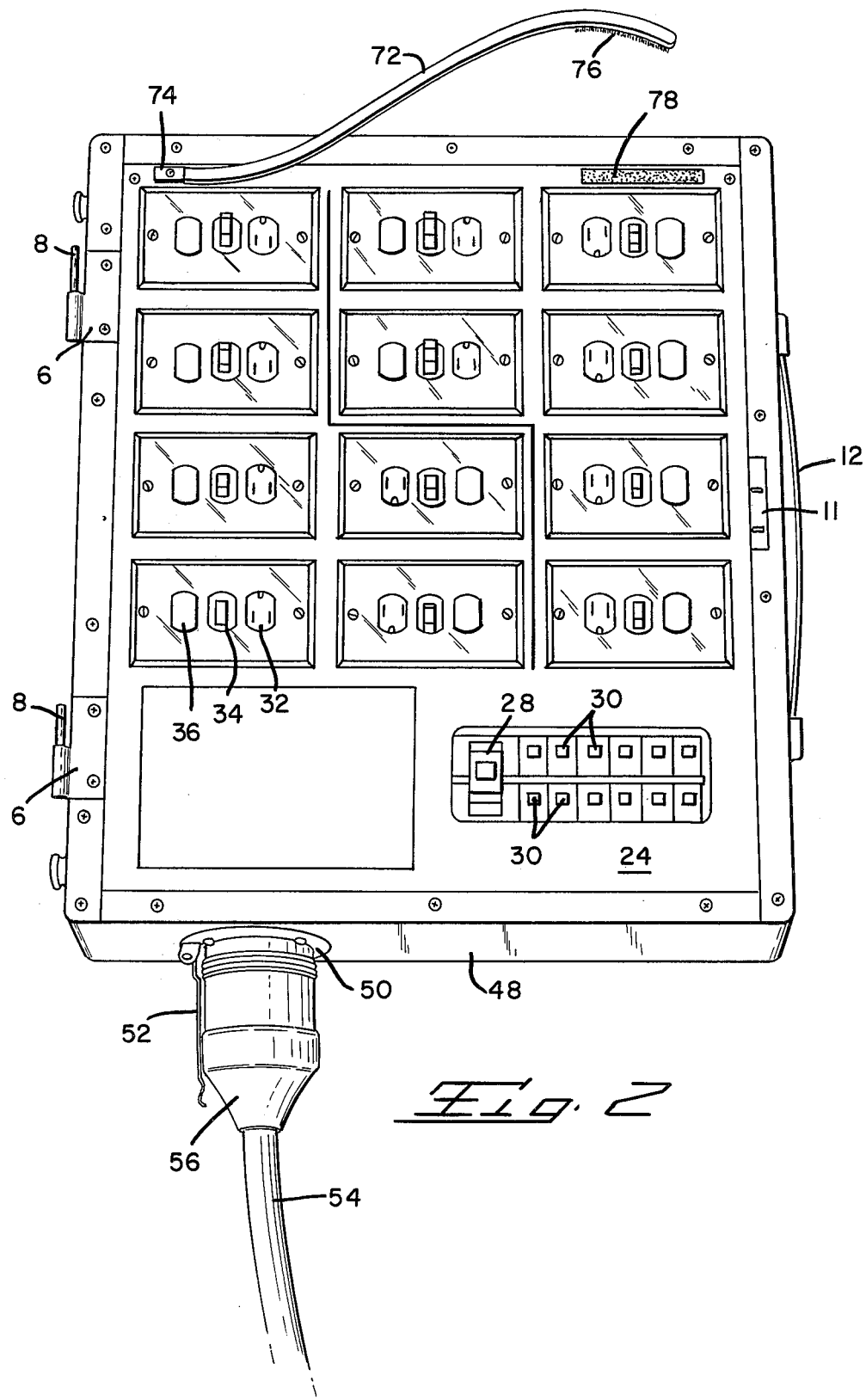
FIGS. 2 and 3 are perspectives of the box of FIG. 1 with the cover removed.
Figure 3:
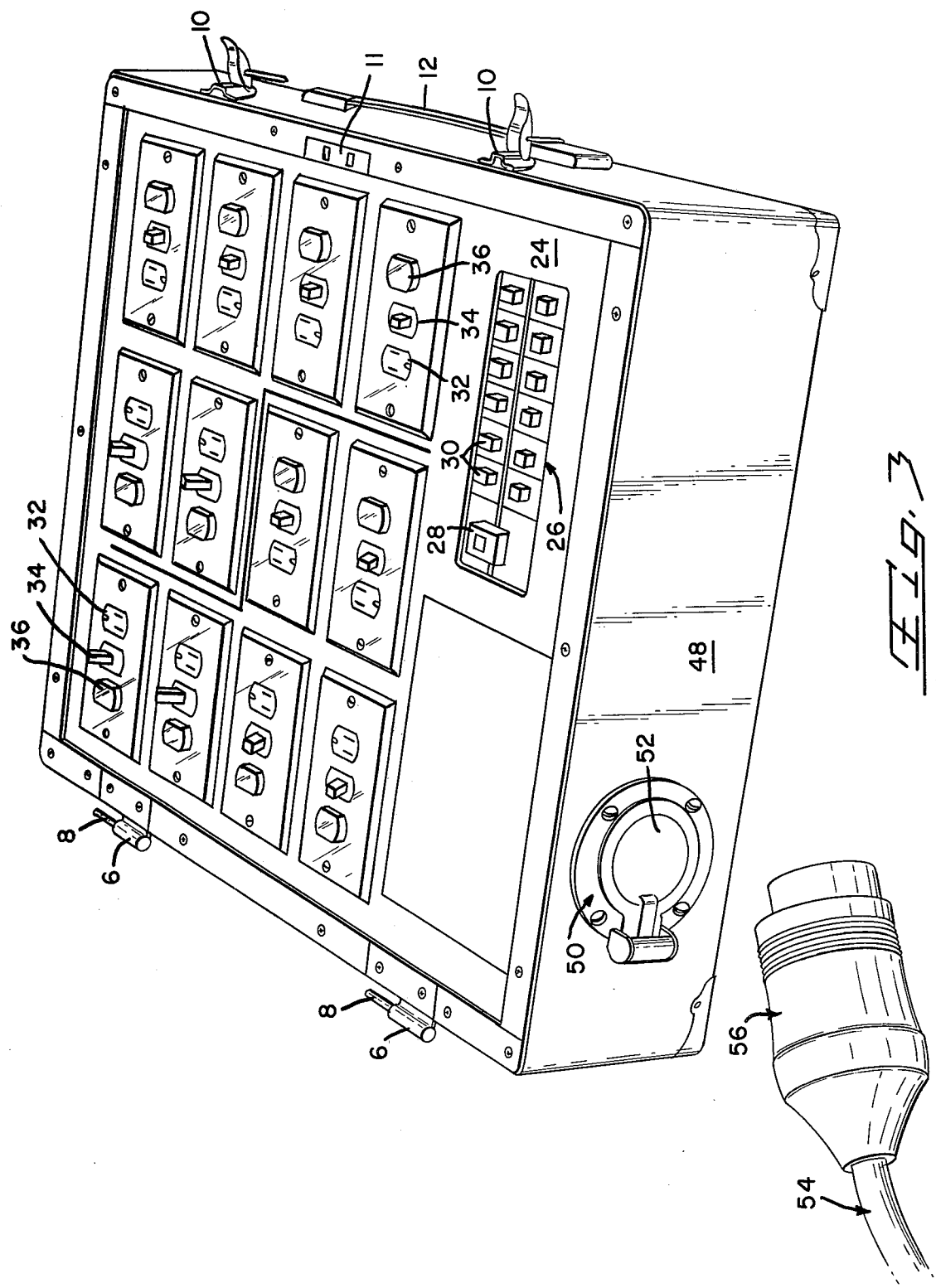

With more particular reference to FIGS. 1-3 of the drawings, a portable power distribution box is shown generally at 1, having a hollow cabinet portion 2 and a hollow cover portion 4, pivotally interconnected by hinges 6, which have headless hinge pins 8, projecting in the same direction along a common axis, and allowing removal of the cover from the cabinet 2 by slidably separating the hinges along the hinge pins. Alternatively the cover may be closed over the cabinet and latched by bail type, suitcase latches 10. A carrying handle allows transport of the box 1 in suitcase fashion. The cover and cabinet are advantageously provided with a suitcase finish, such as a covering skin of upholstery material or other suitable finish material. A lock II is provided for locking the cover over the panel to prevent unauthorized access to the panel during transport or when ready for use.

Figure 6:
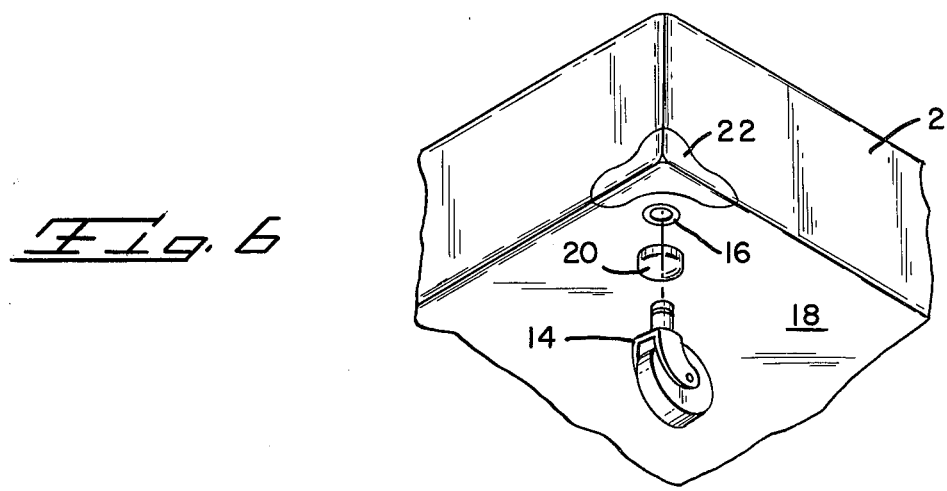
FIG. 6 is a fragmentary perspective of a cover of the distribution box provided with a foot and a removable caster shown exploded out from a caster socket.

As shown in FIGS. 1 and 6, the cover 4 is provided with a storage compartment 12 for casters 14. The casters can be removably mounted in caster sockets 16 provided into the bottom 18 of the cabinet 2. The bottom 18 also is provided with the aforesaid suitcase finish which is protected by projecting, threadably adjustable metal feet 20 and decorative metal, corner cover plates 22.

Figure 7:
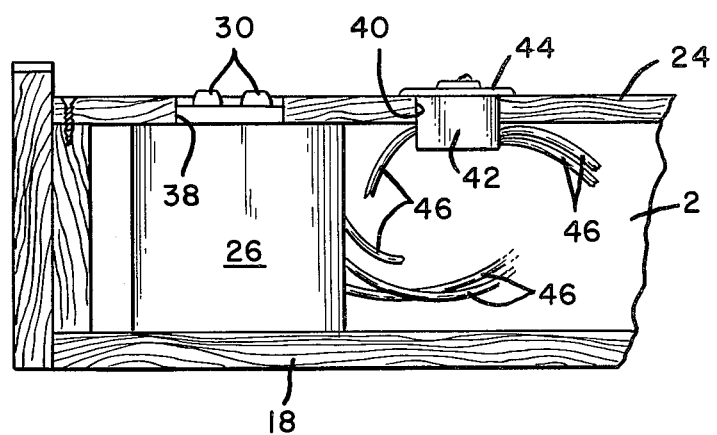
FIG. 7 is a fragmentary elevation of a portion of the distribution box with parts cut away to illustrate a circuit breaker box and one electrical receptacle box.

FIGS. 1-3 illustrate a control panel 24 which comprises the top of the cabinet 2. With the cover 4 removed, the panel 24 is exposed, ready for use, and the entire cabinet 2 may be moved by wheeling the casters 14, or by sliding the feet 20 in the absence of the casters. The panel includes a commercially available push button circuit breaker 26 having a 50 amp rated or other appropriate rated main breaker reset button 28 and twelve secondary breakers with reset buttons 30 and which may be rated, for example, at 110 volts, 20 amps or 15 amps. The panel further includes twelve outlet receptacles 32 each having their own manual toggle switch 34 and a pilot light 36. This type of outlet receptacle is commercially available, and comes in the version as shown, or in a version in which the pilot light is incorporated in the toggel switch or in a version in which a Code approved pilot light is mounted on a separate face plate and is hand wired to the switch and receptacle. FIG. 7 shows that the circuit breaker 26 is mounted inside the hollow cabinet 2 against the bottom wall 18, and against the top wall 24 which is provided with an opening 38 through which the push buttons 28 and 30 project. An additional opening 40 is provided in the panel 24 for a respective receptacle box 42 in which a respective receptacle 32 may be mounted. If the entire cabinet 2 is Code approved, the receptacle 32 may be mounted directly in the opening 40. Each box 42 is covered by a face plate 44 covering the opening 40. Electrical wiring 46 is contained within the cabinet 2 and connects each receptacle 32 to a respective secondary circuit breaker according to the wiring diagram of FIG. 4. The figure also shows each receptacle 32 connected by appropriate color coded wiring to a neutral bus 26A which may be mounted in the cabinet 2 on the bottom wall 18.

Figure 4:
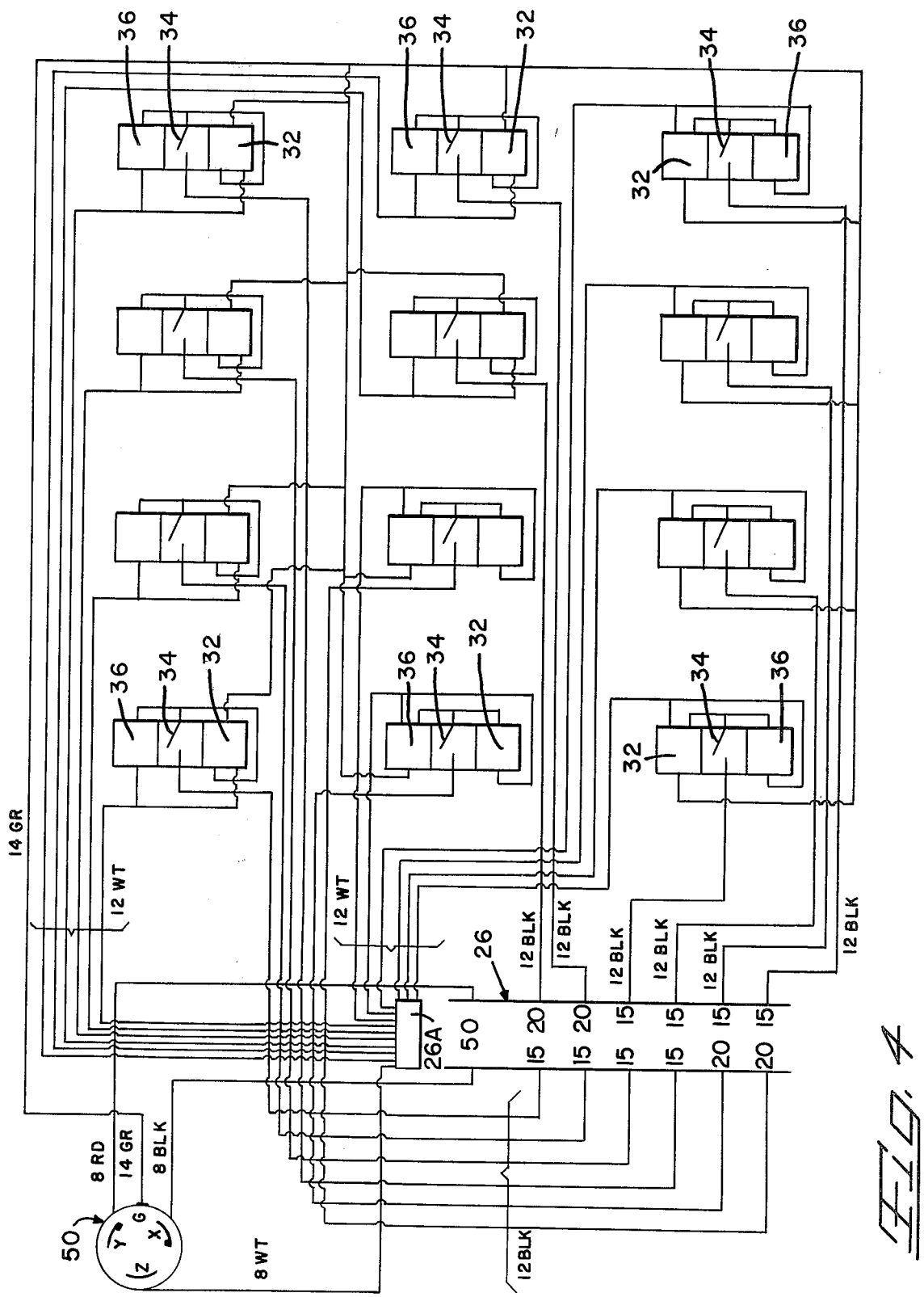
FIG. 4 is a schematic of the circuit which interconnects the electrical components of the distribution box.

FIGS. 1-3 show one side wall 48 of the cabinet 2 providing a mounting panel for a commercially available twist lock plug 50 of the type having a hinged cover 52 and rated for 50 amps, for example, at 220 volts. FIG. 4 shows the wiring diagram for connecting the plug 50 inside the cabinet 2 to the power bus of the circuit breaker 26 and the neutral bus 26A. A separate green wire advantageously provides additional ground protection to each receptacle 32, which may be supplied in their commercial form with a ground wire terminal. The plug 50 is supplied with a power cord 54 having a receptacle connector 56 which is plugged into the plug 50. The cord 54 may be wired by a qualified electrician directly to a circuit breaker of a main breaker box of a buliding's electrical wiring. Alternatively, the cord may be plugged into an existing electrical outlet which usually supplies power to a stove or air conditioner.

Figure 5:
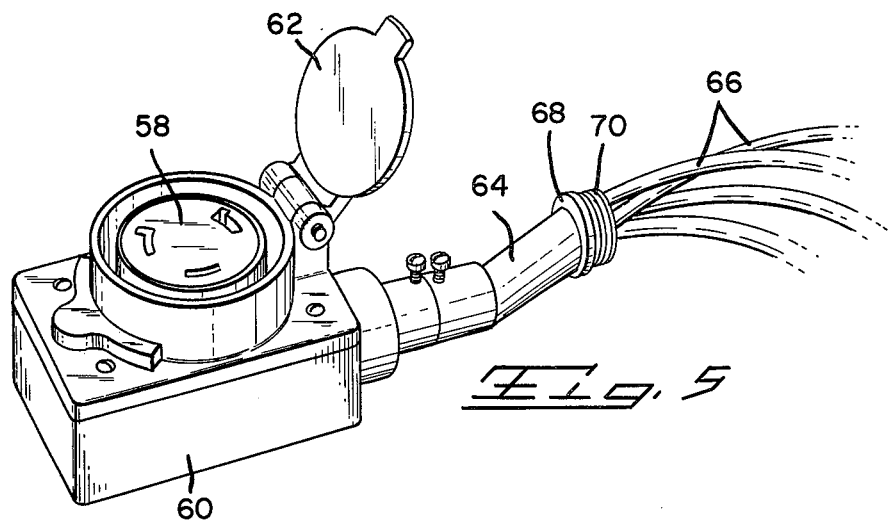
FIG. 5 is a perspective of a power receptacle.

FIG. 5 illustrates another type of twist lock receptacle wired in a commercially available weatherproof box 60. The box has a hinged cover 62 and a length of conduit 64 for the receptacle wiring 66. The conduit has a flange 68 and a threaded end portion 70 for connecting through a knock out wire entry opening provided through a main breaker box. A standard nut is threaded over the conduit end 70 to sandwich the main breaker box between the nut and the flange 68. This receptacle 58 is used to provide an outlet for the power cord 54 directly from the main breaker box, as the local wiring code may require. The wiring 66 is connected to a circuit breaker by an electrician.

Since all the electrical components are commercially available, they are advantageously capable of assembly in the cabinet 2, in a manner, which is familiar to an electrician and which will satisfy wiring codes. Each receptacle has its own switch and pilot light. Any circuit plugged into a receptacle may be switched off to extend the life of high wattage spotlights, or to produce an audio or visual theatrical effect.

All the controls to the circuits are located on the single panel 24, including the resettable circuit breakers which provide overload protection for each circuit. The main circuit breaker also will provide speedy switching off of all the circuits to produce a theatrical blackout effect. The suitcase construction and appearance permits transport and use of the distribution box as a piece of luggage.

A binding strap 72 of flexible material such as leather or nylon has one end secured by a fastener 74 to the panel. The other end is provided with a strip of material 76 such as Velcro which may be secured to a pad of hook section 78 of Velcro fastener material mounted on the panel 24. In use, the strap is disconnected from the Velcro fastening and reconnected thereto over power cords (not shown) which are to be plugged into the receptacles 32. The power cords will be dressed to one side of the panel and tied down by the strap 72.

Although a preferred embodiment of the present invention is shown and described in detail, other embodiments and modifications of the same are intended to be covered by the spirit and scope of the claims.

What is claimed is:

1. In a portable box for power outlet distribution inside which an electrical power cable is connected to a neutral bus and also connected in series to a power bus, and plural outlets are coupled electrically to the neutral bus and through secondary circuit breakers to the power bus, the improvement comprising:
    a panel mounted, first wiring module including said main circuit breaker and said secondary circuit breakers,
    a plurality of panel mounted, second wiring modules, each including an aforesaid outlet and a pilot light and a manually actuated switch,
    each said switch being electrically in series with a respective said secondary circuit breaker and said pilot light and said outlet of the same wiring module,
    said first wiring module and said second wiring modules being mounted on one panel comprising a surface of said portable box,
    an inlet connection with said electrical power cable remote from said one panel,
    a cover hinged to said portable box and closeable over said panel, and
    means for locking said cover over said panel.

2. The structure as recited in claim 1, and further including: an adapter wiring module comprising a conductive box enclosing a twist lock receptacle wired to said power bus and said ground bus, and a ground wire connecting said conductive box with a ground connection provided on each said outlet.

3. The structure as recited in claim 1, wherein, said portable box is provided with caster sockets on a side separate from the panel side of said box, and further including,
    casters in removeable assembly in said caster sockets, said cover being provided with storage space for said casters.

4. The structure as recited in claim 1, wherein, said cover and said portable box include cooperating latches which assemble said cover protectively over said panel.

5. The structure as recited in claim 5, wherein, said portable box is provided therein with binding means for tying down electrical outlet cords plugged into said outlets.

6. The structure as recited in claim 1, and further including: hinges connecting said cover and said portable box provided with headless hinge pins to facilitate removal of said cover from said portable box.

7. The structure as recited in claim 1, wherein, said cover and said portable box are provided with a suitcase finish and projecting feet for supporting said portable box and said cover off said finish.

8. The structure as recited in claim 1, wherein, said secondary circuit breakers are push to reset type, with said main circuit breaker being constructed for blackout programming capability and each of said switches being constructed for blackout programming capability of respective outlets of the same wiring module.

* * * * *